(12) United States Patent
Madhani

(10) Patent No.: US 8,855,377 B1
(45) Date of Patent: Oct. 7, 2014

(54) METHOD AND SYSTEM FOR SEMI-AUTOMATED SETUP OF ACCOUNTS WITHIN A DATA MANAGEMENT SYSTEM

(75) Inventor: Sunil Madhani, Karnataka (IN)

(73) Assignee: Intuit Inc., Mountain View, CA (US)

( * ) Notice: Subject to any disclaimer, the term of this patent is extended or adjusted under 35 U.S.C. 154(b) by 188 days.

(21) Appl. No.: 13/416,966

(22) Filed: Mar. 9, 2012

(51) Int. Cl.
*G06K 9/00* (2006.01)

(52) U.S. Cl.
USPC .......................................... 382/115; 382/140

(58) Field of Classification Search
None
See application file for complete search history.

(56) References Cited

U.S. PATENT DOCUMENTS

| | | | |
|---|---|---|---|
| 5,530,438 A | 6/1996 | Bickham et al. | |
| 5,559,313 A | 9/1996 | Claus et al. | |
| 5,737,440 A | 4/1998 | Kunkler | |
| 5,796,868 A * | 8/1998 | Dutta-Choudhury | 382/199 |
| 5,878,337 A | 3/1999 | Joao et al. | |
| 6,167,378 A | 12/2000 | Webber, Jr. | |
| 6,574,600 B1 | 6/2003 | Fishman et al. | |
| 6,908,031 B2 | 6/2005 | Seifert et al. | |
| 7,376,618 B1 | 5/2008 | Anderson et al. | |
| 7,970,701 B2 | 6/2011 | Lewis et al. | |
| 8,073,759 B1 | 12/2011 | Del Favero et al. | |
| 8,121,950 B2 | 2/2012 | Hassanein et al. | |
| 8,170,932 B1 | 5/2012 | Krakowiecki et al. | |
| 8,175,897 B2 | 5/2012 | Lee et al. | |
| 8,204,809 B1 * | 6/2012 | Wise | 705/35 |
| 8,234,195 B1 | 7/2012 | Berhanu et al. | |
| 8,244,629 B2 | 8/2012 | Lewis et al. | |
| 8,254,535 B1 | 8/2012 | Madhavapeddi | |
| 8,499,046 B2 * | 7/2013 | Zheng | 709/206 |
| 2002/0128917 A1 | 9/2002 | Grounds | |
| 2003/0061132 A1 | 3/2003 | Yu et al. | |
| 2003/0182218 A1 | 9/2003 | Blagg | |
| 2004/0083134 A1 | 4/2004 | Spero et al. | |
| 2004/0111371 A1 | 6/2004 | Friedman | |
| 2005/0080649 A1 * | 4/2005 | Alvarez et al. | 705/1 |
| 2005/0267840 A1 | 12/2005 | Holm-Blagg et al. | |
| 2006/0031123 A1 | 2/2006 | Legget et al. | |
| 2006/0036543 A1 | 2/2006 | Blagg et al. | |
| 2006/0196930 A1 | 9/2006 | Hart et al. | |
| 2008/0140505 A1 | 6/2008 | Romano et al. | |
| 2008/0140576 A1 | 6/2008 | Lewis et al. | |
| 2008/0208693 A1 * | 8/2008 | Milstein et al. | 705/14 |
| 2008/0222037 A1 | 9/2008 | Foss et al. | |
| 2008/0222054 A1 | 9/2008 | Blagg et al. | |
| 2009/0030692 A1 | 1/2009 | Deligne et al. | |
| 2009/0037461 A1 | 2/2009 | Rukonic et al. | |
| 2009/0094182 A1 | 4/2009 | Najarian et al. | |
| 2009/0222364 A1 | 9/2009 | McGlynn et al. | |
| 2009/0300068 A1 | 12/2009 | Tang | |

(Continued)

OTHER PUBLICATIONS

Channakeshava, "Method and System for Improving Automatic Categorization of Financial Transactions," U.S. Appl. No. 13/193,445, filed Jul. 28, 2011.

Channakeshava, "Method and System for Automatically Obtaining and Categorizing Cash Transaction Data Using a Mobile Computing System," U.S. Appl. No. 13/272,946, filed Oct. 13, 2011.

(Continued)

*Primary Examiner* — Daniel Mariam
(74) *Attorney, Agent, or Firm* — Hawley Troxell Ennis & Hawley LLP; Philip McKay

(57) ABSTRACT

Digital images of account related items, such as credit cards, membership cards, ATM cards, checks, etc., are captured. The digital image of the account related items is then converted into electronic account data that is used to auto-fill add account information data fields of add account forms and semi-automatically add the accounts associated with the account related items to a data management system.

29 Claims, 5 Drawing Sheets

(56) References Cited

U.S. PATENT DOCUMENTS

| | | |
|---|---|---|
| 2009/0307136 A1 | 12/2009 | Hawkins |
| 2009/0321522 A1 | 12/2009 | Lohr et al. |
| 2009/0327134 A1 | 12/2009 | Carlson et al. |
| 2010/0138328 A1 | 6/2010 | Venturo et al. |
| 2010/0217691 A1 | 8/2010 | Gillin et al. |
| 2010/0287099 A1 | 11/2010 | Liu et al. |
| 2011/0029396 A1 | 2/2011 | Sobek |
| 2011/0093324 A1 | 4/2011 | Fordyce et al. |
| 2011/0112869 A1 | 5/2011 | Greak |
| 2011/0225637 A1 | 9/2011 | Counterman |
| 2011/0264543 A1 | 10/2011 | Taveau et al. |
| 2011/0282778 A1 | 11/2011 | Wright et al. |
| 2011/0302011 A1 | 12/2011 | Yoder et al. |
| 2012/0047052 A1 | 2/2012 | Patel |
| 2012/0130796 A1 | 5/2012 | Busch |
| 2012/0143772 A1 | 6/2012 | Abadir |
| 2012/0315881 A1 | 12/2012 | Woloshyn |
| 2013/0124263 A1 | 5/2013 | Amaro et al. |
| 2013/0318446 A1 * | 11/2013 | Ghotgalkar et al. .......... 715/744 |

OTHER PUBLICATIONS

Madhani, "Method and System for Automated Classification and Categorization of Hardcopy Financial Transaction Records," U.S. Appl. No. 13/456,383, filed Apr. 26, 2012.

Rukonic et al., "Method and System for Identifying a Merchant Payee Associated with a Cash Transaction," U.S. Appl. No. 13/653,083, filed Oct. 16, 2012.

Channakeshava, "Method and System for Automatic Classification of Check and Cash Transactions by a Financial Management System," U.S. Appl. No. 13/752,041, filed Jan. 28, 2013.

Whittam et al., "Method and System for Utilizing Location Data for Automatic Categorization of Financial Transactions," U.S. Appl. No. 13/149,776, filed May 31, 2011.

Bhattacharyya et al., "Method and System for Automatic Categorization of Check-Based Financial Transactions," U.S. Appl. No. 13/350,517, filed Jan. 13, 2012.

Channakeshava, "Method and System to Simplify the Financial Institution Discovery and Add Accounts Processes for Data Management Systems," U.S. Appl. No. 13/459,505, filed Apr. 30, 2012.

* cited by examiner

METHOD AND SYSTEM FOR SEMI-AUTOMATED SETUP OF ACCOUNTS WITHIN A DATA MANAGEMENT SYSTEM

BACKGROUND

Over the past decade data management systems have enjoyed increasing popularity and use throughout the world. One important class of data management systems currently available are financial management systems.

Financial management systems are typically software applications which, along with a parent computing system or device, help users manage their finances by providing a centralized interface with banks, credit card companies, and other various financial institutions, to access associated accounts and obtain financial data for electronically identifying and categorizing user financial transactions. Currently, financial management systems typically obtain data associated with electronic financial transactions, such as payee, payment amount, date, etc. via access to a user's accounts with banks, credit card providers, or other financial institutions, using user provided login data and electronic data transfer systems or various other means for transferring financial transaction data.

While, as noted, financial management systems have enjoyed increasing popularity and now offer a significant array of services and/or features on both desktop and mobile platforms, one area that continues to be problematic for users of financial management systems, and particularly users of mobile financial management systems, is the process of adding and/or changing accounts that are to be accessed in order to provide data to the financial management system. This is particularly problematic when the user is initially using the financial management system because there are typically multiple accounts to be added, and the experience is likely to create the user's first, and lasting, impression of the financial management system and its ease of use Currently, when a user of a financial management system desires to add or change one or more accounts to be associated with, and/or accessed by, a financial management system, the user must first access and interact, e.g., tap or otherwise manipulate, an interface screen on a display device of a user computing system to begin the add account process for each new bank account, credit card account, or other type of account.

The user must then search for the required/desired financial institution name associated with the new account in a search box, drop down menu, etc. In many cases, this step alone becomes an issue as potential users of financial management systems are often unable to find the desired financial institutions to add for one of various reasons including, but not limited to, typographical errors and/or misspellings, or the financial institution is not included in the provided listing of financial institutions.

Once, and if, the financial institution associated with the account is discovered/selected, the user must then select the financial institution name associated with the account and enter the account number manually. Only then can the user begin to enter the user's login data, e.g., password and user name, for the account.

Currently, even if successful, the add account process described above is tedious and must be repeated for each new/added account; thereby requiring the repeated accessing of multiple screens and/or interfaces for each added account. As a result, the current add account process is extremely burdensome for the user and particularly problematic for mobile computing system users who must enter the data via small display screens and with limited data input interface devices and capabilities.

Given that the process of adding and/or changing accounts for use with a financial management system plays a crucial role in enhancing user/customer satisfaction, and often determines if the customer continues the implementation and use of the financial management system, the situation described above is a significant problem for both the potential user of a financial management system and a provider of the financial management system. In addition, the situation described above is even more problematic for the ever increasing number of mobile financial management system users.

What is needed is a method and system to simplify the process of adding and/or changing accounts to be used within a data management system by making the add/change account process highly automated, intuitive, easy, efficient, and relatively error free.

SUMMARY

In accordance with one embodiment, a system and method for semi-automated setup of accounts within a data management system includes a process for semi-automated setup of accounts within a data management system whereby the common availability of digital image capturing capabilities, such as digital cameras, on computing systems, and particularly mobile computing systems, is leveraged. In one embodiment, digital images of account related items, such as credit cards, membership cards, or ATM cards, checks, etc., are captured. In one embodiment, a digital image of multiple account related items is captured at once.

In one embodiment, one or more edge/boundary systems are used to detect each individual account related item. In one embodiment, the digital image of the account related items are then converted by one or more OCR systems into electronic account information data that is used to auto-fill add account information data fields of add account forms and semi-automatically add the accounts associated with the account related items to a data management system, such as a financial management system.

Using the system and method for semi-automated setup of accounts within a data management system as disclosed herein, a process is provided to simplify the add account process by making the add account process highly automated, intuitive, easy, efficient, and relatively error free.

Figure 1:
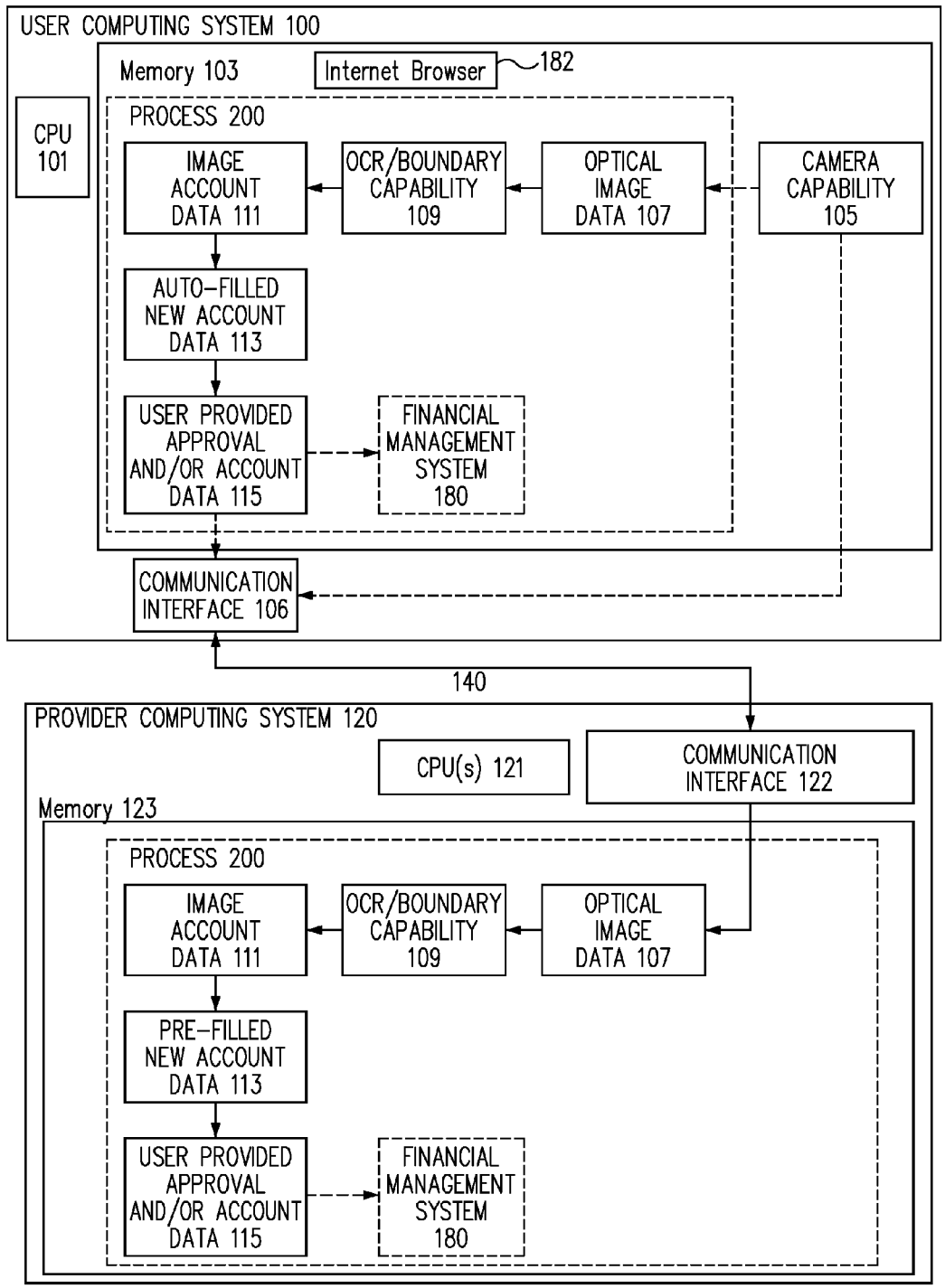
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a user lays down account related items, such as, but not limited to, multiple account and/or membership cards, credit cards, ATM cards, bank account checks, frequent flyer cards, discount club cards, membership cards, checks, and/or any other account related items associated with a user account as discussed herein, and/or as known in the art/available at the time of filing, and/or as developed/made available after the time of filing, and takes a digital image of the collection.

In one embodiment, the digital image is obtained using a camera function included as part of a user computing system. In one embodiment, the digital image is obtained using a camera function included as part of a user mobile computing system, such as a mobile phone associated with the user.

As used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Herein, the terms "mobile computing system" and "mobile device" are used interchangeably and include, but are not limited to: a portable computer; a two-way pager; a cellular telephone; a smart phone; a tablet computing system; a notebook computing system; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

In one embodiment, one or more mobile computing systems are connected by one or more mobile communications networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, the digital image data is then processed by one or more Optical Character Recognition (OCR) systems and/or edge/boundary detection algorithms to identify all the individual account related items.

In one embodiment, the edge/boundary detection algorithms detect the number of account related items in the collection and the OCR systems use an OCR library, such as Nuance™ or Abby mobile OCR Library™, to detect the financial institution, or other name, and/or account number data associated with account related items.

In one embodiment, account information associated with each of the identified individual account related items/accounts is then detected/extracted, associated with the identified individual account related items, and saved.

In one embodiment, the account information associated with each of the identified individual account related items is then used to auto-fill data entry fields in add account forms used with the data management system.

In one embodiment, the auto-filled add account forms are then presented to the user for review and/or approval. In one embodiment, once the user approves the addition of the identified accounts and account information, the user provides login information, such as password and user name information, for each new/added account, thereby completing the add account forms and add account process.

In one embodiment, the approved identified accounts, account information, user name information, and account login information, i.e., the completed add account forms, is/are then automatically provided to a data management system, such as a financial management system, and/or used by the data management system to obtain data associated with the user.

Herein, a financial management system can be, but is not limited to, any data management system implemented on a computing system and/or accessed through a network that gathers financial data, including financial transactional data, from one or more sources and/or has the capability to analyze and categorize at least part of the financial data.

As used herein, the term financial management system includes, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filing or as developed later.

Specific examples of financial management systems include, but are not limited to: Quicken™, available from Intuit, Inc. of Mountain View, Calif.; Quicken On-Line™, available from Intuit, Inc. of Mountain View, Calif.; QuickBooks™, available from Intuit, Inc. of Mountain View, Calif.; QuickBooks On-Line™, available from Intuit, Inc. of Mountain View, Calif.; Mint™, available from Intuit, Inc. of Mountain View, Calif.; Mint Mobile™, available from Intuit, Inc. of Mountain View, Calif., Quicken Health Expense Manager™, available from Intuit, Inc. of Mountain View, Calif.; Microsoft Money™, previously available from Microsoft, Inc. of Redmond, Wash.; and/or various other financial management systems discussed herein, and/or known to those of skill in the art at the time of filing, and/or as developed after the time of filing.

Hardware System Architecture

FIG. 1 is a block diagram of an exemplary hardware architecture for implementing one embodiment of a system and method for semi-automated setup of accounts within a data management system, such as exemplary process 200 (FIG. 2) discussed herein, that, returning to FIG. 1, includes: a user computing system 100, e.g., a user mobile computing system such as a user mobile phone; an optional provider computing system 120, e.g., a second computing system associated with a provider of the process for semi-automated setup of accounts within a data management system and/or a financial management system; and a communications link 140.

As seen in FIG. 1, computing system 100 typically includes a central processing unit (CPU) 101, a communications interface 106; a camera capability 105; and a memory system 103.

In one embodiment, computing system 100 is any computing system, and/or mobile computing system, as discussed herein, and/or as known/available in the art at the time of filing, and/or as developed/made available after the time of filing.

As noted above, as used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As also noted above, the term "mobile computing system" and "mobile device" are used interchangeably and include, but are not limited to: a portable computer; a two-way pager; a cellular telephone; a smart phone; a digital wireless telephone; a tablet computing system; a notebook computing system; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, memory system 103 includes all, or part, of a financial management system 180, such as any financial management system discussed herein, known in the art at the time of filing, and/or as developed thereafter.

In one embodiment, memory system 103 includes all, or part, of process for semi-automated setup of accounts within a data management system 200, shown as process 200 in FIG. 1.

In one embodiment, memory system 103 and process for semi-automated setup of accounts within a data management system 200 includes digital image data 107 obtained from camera capability 105.

In one embodiment, a user lays down account related items, such as, but not limited to, multiple account and/or membership cards, credit cards, ATM cards, bank account checks, frequent flyer cards, discount club cards, membership cards, checks, and/or any other account related items associated with a user account as discussed herein, and/or as known in the art/available at the time of filing, and/or as developed/made available after the time of filing, and takes a digital image of the collection using digital camera capability 105 to obtain digital image data 107.

In one embodiment, digital image data 107 is processed by one or more Optical Character Recognition (OCR) systems and/or edge/boundary detection algorithms, shown as OCR/boundary capability 109, to identify all the individual account related items.

In one embodiment, the edge/boundary detection algorithms of OCR/boundary capability 109 detect the number of account related items in the collection and the OCR systems use an OCR library, such as Nuance™ or Abby mobile OCR Library™, to detect the financial institution, or other name, and/or account number data associated with account related items.

In one embodiment, as a result of the processing by OCR/boundary capability 109, digital image data 107 is transformed into image account data 111. In one embodiment image account data 111 includes extracted account information associated with each of the identified individual account related items/accounts.

In one embodiment, the account information associated with each of the identified individual account related items of image account data 111 is then used to auto-fill data entry fields in add account forms used with the financial management system and transformed into auto-filled new account data 113.

In one embodiment, the auto-filled new account forms of auto-filled new account data 113 are then presented to the user for review and/or approval. In one embodiment, the user approves the addition of the identified accounts and account information and the user provides login information, such as password and user name information, for each account. In FIG. 1, user provided approval and/or account information data 115 includes the data representing the user approval and/or user provided login information.

In one embodiment, user provided approval and/or account information data 115 is used to complete the add account forms of auto-filled new account data 113 and the completed add account forms are provided to financial management system 180, thereby completing the add account forms and add account process.

Returning to FIG. 1, computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, user computing system 100, whether available or known at the time of filing or as later developed.

In one embodiment, computing system 100 also includes an Internet browser capability 182 that, in one embodiment, includes a search engine (not shown) and is stored, in whole, or in part in memory 103.

In some embodiments, any of the functions discussed above with respect to user computing system 100 are performed by an optional second computing system, such as a computing system associated with a provider of process for semi-automated setup of accounts within a data management system 200.

An optional provider computing system 120 is shown in FIG. 1. As seen in FIG. 1, provider computing system 120 typically includes a central processing unit (CPUs) 121, communications interface 122, and a memory system 123.

In one embodiment, memory 123, and/or process 200, includes all, or part, of a financial management system 180, such as any financial management system discussed herein, known in the art at the time of filing, and/or as developed thereafter.

In one embodiment, memory 123 includes all or part of process for semi-automated setup of accounts within a data management system 200, shown as process 200 in FIG. 1.

In one embodiment, memory 123 and process for semi-automated setup of accounts within a data management system 200 includes digital image data 107 obtained from camera capability 105 of user computing system 100.

In one embodiment, digital image data 107 is processed by one or more OCR systems and/or edge/boundary detection algorithms, shown as OCR/boundary capability 109 to identify all the individual account related items.

In one embodiment, the edge/boundary detection algorithms of OCR/boundary capability 109 detect the number of account related items in the collection and the OCR systems use an OCR library, such as Nuance™ or Abby mobile OCR Library™, to detect the financial institution, or other name, and/or account number data associated with account related items.

In one embodiment, as a result of the processing by OCR/boundary capability 109, digital image data 107 is transformed into image account data 111. In one embodiment image account data 111 includes extracted account information associated with each of the identified individual account related items/accounts.

In one embodiment, the account information associated with each of the identified individual account related items of image account data 111 is then used to auto-fill data entry fields in add account forms used with the financial management system and transformed into auto-filled new account data 113.

In one embodiment, the auto-filled new account forms of auto-filled new account data 113 are then presented to the user for review and/or approval. In one embodiment, the user approves the addition of the identified accounts and account information and the user provides login information, such as password and user name information, for each account. In FIG. 1, user provided approval and/or account information data 115 includes the data representing the user approval and/or user provided login information.

In one embodiment, user provided approval and/or account information data 115 is used to complete the add account forms of auto-filled new account data 113 and the completed add account forms are provided to financial management system 180, thereby completing the add account forms and add account process.

In one embodiment, computing systems 100 and 120 are linked together via communications channel 140. In various embodiments, communications channel 140 can be, but is not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

In one embodiment, computing systems 100 and 120 are part of a cloud computing environment.

Those of skill in the art will readily recognize that the components shown in FIG. 1, and their respective sub-components are shown for illustrative purposes only and that architectures with more or fewer components can implement, and benefit from, the invention. Moreover, one or more components may be located remotely from their respective system and accessed via network, as discussed herein. In addition, the particular type of, and configuration of, computing systems 100 and 120 are not relevant.

Those of skill in the art will readily recognize that the components shown in FIG. 1, and their respective sub-components, are shown for illustrative purposes only and that architectures with more or fewer components can implement, and benefit from, one or more embodiments. Moreover, one or more components of computing systems 100 and 120 may be located remotely from their respective system and accessed via communication channel 140.

As discussed in more detail below, in one embodiment, a process for semi-automated setup of accounts within a data management system, and/or a financial management system, is stored, in whole, or in part, in one or more memory systems, and/or cache memories, associated with one or more computing systems. As used herein, a memory refers to a volatile memory, a non-volatile memory, or any combination of the two.

Although a process for semi-automated setup of accounts within a data management system, and/or a financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for semi-automated setup of accounts within a data management system, and/or a financial management system, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 121. In one embodiment, execution of a process by CPU 101 or 121 results in the operations of an agent computer process (not shown) and/or a rule computer process (not shown).

In one embodiment, a process for semi-automated setup of accounts within a data management system, and/or a financial management system, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system or the medium may be removable and/or remote from the computing system.

Process

Herein, the term "user" and "user consumer" are used interchangeably to denote any party and/or entity that interfaces with, and/or to whom information is provided by, a process for semi-automated setup of accounts within a data management system, and/or a person and/or entity that interfaces with, and/or to whom information is provided by, a process for semi-automated setup of accounts within a data management system, and/or a legal guardian of person and/or entity that interfaces with, and/or to whom information is provided by, a process for semi-automated setup of accounts within a data management system, and/or an authorized agent of any party and/or person and/or entity that interfaces with, and/or to whom information is provided by, a process for semi-automated setup of accounts within a data management system.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

In accordance with one embodiment, a system and method for semi-automated setup of accounts within a data management system includes a process for semi-automated setup of accounts within a data management system whereby the common availability of digital image capturing capabilities, such as digital cameras, on computing systems, and particularly mobile computing systems, is leveraged. In one embodiment, digital images of account related items, such as credit cards, membership cards, or ATM cards, checks, etc., are captured. In one embodiment, a digital image of multiple account related items is captured at once. In one embodiment, one or more edge/boundary systems are used to detect each individual account related item. In one embodiment, the digital image of the account related items are then converted by one or more OCR systems into electronic account data that is used to auto-fill add account information data fields of add account forms and semi-automatically add the accounts associated with the account related items to a data management system.

Figure 2:
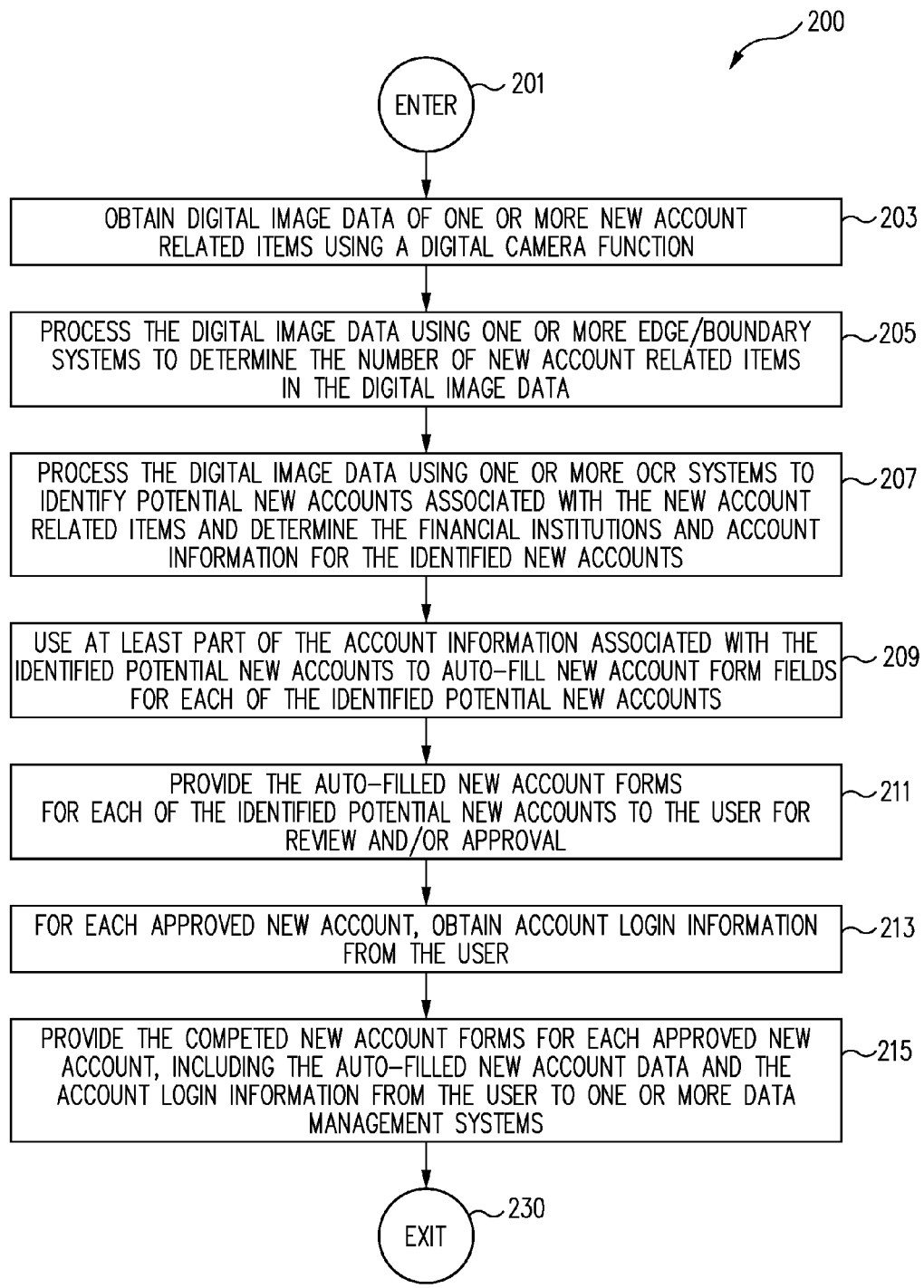
FIG. 2 is a flow chart depicting a process for semi-automated setup of accounts within a data management system in accordance with one embodiment.

FIG. 2 is a flow chart depicting a process for semi-automated setup of accounts within a data management system 200 in accordance with one embodiment. Process for semi-automated setup of accounts within a data management system 200 begins at ENTER OPERATION 201 of FIG. 2 and process flow proceeds to OBTAIN DIGITAL IMAGE DATA OF ONE OR MORE NEW ACCOUNT RELATED ITEMS USING A DIGITAL CAMERA FUNCTION OPERATION 203.

In one embodiment, at OBTAIN DIGITAL IMAGE DATA OF ONE OR MORE NEW ACCOUNT RELATED ITEMS USING A DIGITAL CAMERA FUNCTION OPERATION 203 a digital image of account related items, such as, but not limited to, multiple account and/or membership cards, credit cards, ATM cards, bank account checks, frequent flyer cards, discount club cards, membership cards, checks, and/or any other account related items associated with a user account as discussed herein, and/or as known in the art/available at the time of filing, and/or as developed/made available after the time of filing, is captured.

In one embodiment, at OBTAIN DIGITAL IMAGE DATA OF ONE OR MORE NEW ACCOUNT RELATED ITEMS USING A DIGITAL CAMERA FUNCTION OPERATION 203 a user lays down account related items, such as, but not limited to, multiple account and/or membership cards, credit cards, ATM cards, bank account checks, frequent flyer cards, discount club cards, membership cards, checks, and/or any other account related items associated with a user account as discussed herein, and/or as known in the art/available at the time of filing, and/or as developed/made available after the time of filing, and takes a picture of the collection using a digital camera function, such as digital camera capability 105 of FIG. 1, associated with a user computing system, such as user computing system 100 of FIG. 1.

In one embodiment, the digital image of the of the collection of account related items is obtained using a camera function included as part of a user mobile computing system, such as a mobile phone associated with the user.

Figure 3:
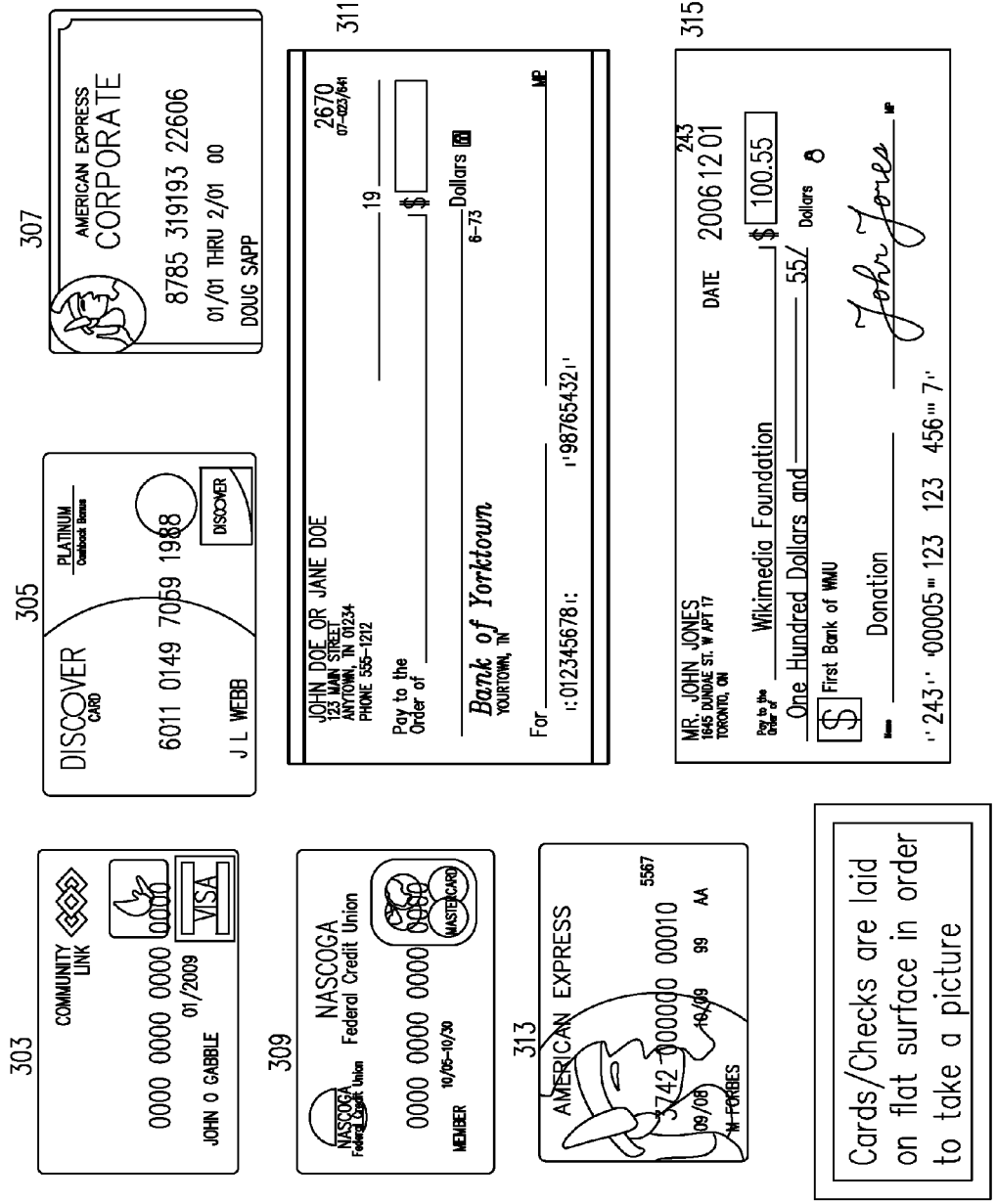
FIG. 3 is an illustrative example of a digital image of multiple account related items laid out by a user and captured using a digital camera function of a user computing system, such as a user mobile computing system associated with the user, in accordance with one embodiment.

FIG. 3 is an illustrative example of a digital image of multiple account related items 303, 305, 307, 309, 311, 313, and 315, laid out by a user and captured using a digital camera function of a user computing system, such as a user mobile computing system associated with the user, in accordance with one embodiment.

As seen in FIG. 3: account related item 303 is an ATM card for an account with "Community Bank" having an account number ending in "0000"; account related item 305 is a "Discover Card" credit account card with an account number ending in "1388"; account related item 307 is an "American Express" or "Amex" corporate credit account card with an account number ending in "2606"; account related item 309 is a "Nascoga Credit Union" account card with an account number ending in "0000"; account related item 311 is a "Bank of Your Town" check associated with a checking account having an account number ending in "5432"; account related item 313 is an "American Express" or "Amex" personal credit account card with an account number ending in "0010"; and account related item 315 is a "First Bank of WMU" check associated with a checking account having an account number ending in "56-7".

Those of skill in the art will recognize that the account related items 303, 305, 307, 309, 311, 313, and 315 shown in FIG. 3 were chosen for illustrative purposes and multiple other account related items including, but not limited to, frequent flyer cards, discount club cards, membership cards, and/or any other account related items associated with a user account as discussed herein, and/or as known in the art/available at the time of filing, and/or as developed/made available after the time of filing, can be utilized in various embodiments. Consequently, the specific account related items shown in FIG. 3, and discussed herein, should not be read to limit the scope of the claims presented below.

Returning to FIG. 2, in one embodiment, once a digital image of account related items is captured at OBTAIN DIGITAL IMAGE DATA OF ONE OR MORE NEW ACCOUNT RELATED ITEMS USING A DIGITAL CAMERA FUNCTION OPERATION 203, process flow proceeds to PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205.

In one embodiment, at PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205 the digital image data of OBTAIN DIGITAL IMAGE DATA OF ONE OR MORE NEW ACCOUNT RELATED ITEMS USING A DIGITAL CAMERA FUNCTION OPERATION 203 is processed by one or more edge/boundary detection algorithms to identify all the individual account related items.

In one embodiment, at PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205 the digital image data of OBTAIN DIGITAL IMAGE DATA OF ONE OR MORE NEW ACCOUNT RELATED ITEMS USING A DIGITAL CAMERA FUNCTION OPERATION 203 is processed by one or more OCR systems and/or edge/boundary detection algorithms such as OCR/boundary capability 109 of FIG. 1, to identify all the individual account related items.

Returning to FIG. 2, in one embodiment, the edge/boundary detection algorithms of PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205 detect the number of account related items in the collection of account items.

As discussed below, in one embodiment, OCR systems use an OCR library, such as Nuance™ or Abby mobile OCR Library™, to detect the financial institution, or other name, and/or account number data associated with account related items.

Figure 4:
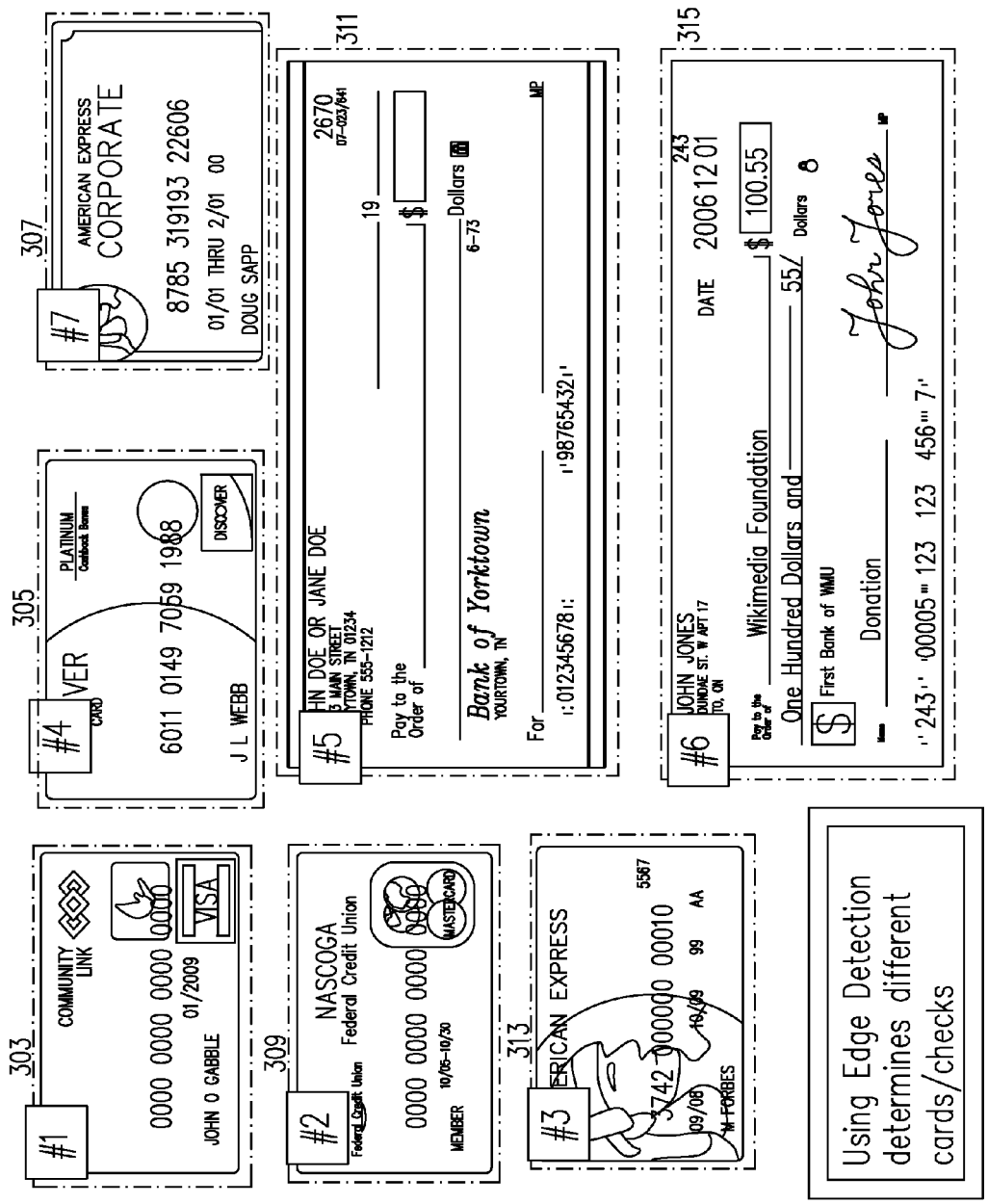
FIG. 4 is an illustrative example of the digital image of FIG. 3 after having been processed by one or more Optical Character Recognition (OCR) systems and/or edge/boundary detection algorithms to identify all the individual account related items in the digital image of FIG. 3, in accordance with one embodiment.

FIG. 4 is an illustrative example of the digital image of FIG. 3 after having been processed by one or more OCR systems and/or edge/boundary detection algorithms at PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205 to identify all the individual account related items in the digital image of FIG. 3, in accordance with one embodiment.

As seen in FIG. 4, at PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205: account related item 303 that is an ATM card for an account with "Community Bank" having an account number ending in "0000" is identified as/designated account item #1; account related item 309 that is a "Nascoga Credit Union" account card with an account number ending in "0000" is identified as/designated account item #2; account related item 313 that is an "American Express" or "Amex" personal credit account card with an account number ending in "0010" is identified as/designated account item #3; account related item 305 that is a "Discover Card" credit account card with an account number ending in "1388" is identified as/designated account item #4; account related item 311 that is a "Bank of Your Town" check associated with a checking account having an account number ending in "5432" is identified as/designated account item #5; account related item 315 that is a "First Bank of WMU" check associated with a checking account having an account number ending in "56-7" is identified as/designated account item #6; and account related item 307 that is an "American Express" or "Amex" corporate credit account card with an account number ending in "2606" is identified as/designated account item #7.

As discussed above, those of skill in the art will recognize that the account related items 303, 305, 307, 309, 311, 313, and 315 shown in FIG. 3 were chosen for illustrative purposes and multiple other account related items including, but not limited to, frequent flyer cards, discount club cards, membership cards, and/or any other account related items associated with a user account as discussed herein, and/or as known in the art/available at the time of filing, and/or as developed/made available after the time of filing, can be utilized in various embodiments. Consequently, the specific account related items shown in FIG. 3, and as discussed herein, should not be read to limit the scope of the claims presented below.

Returning to FIG. 2, in one embodiment, once the digital image data of OBTAIN DIGITAL IMAGE DATA OF ONE OR MORE NEW ACCOUNT RELATED ITEMS USING A DIGITAL CAMERA FUNCTION OPERATION 203 is processed by one or more edge/boundary detection algorithms to identify all the individual account related items at PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205, process flow proceeds to PROCESS THE DIGITAL IMAGE DATA USING ONE OR MORE OCR SYSTEMS TO IDENTIFY POTENTIAL NEW ACCOUNTS ASSOCIATED WITH THE NEW ACCOUNT RELATED ITEMS AND DETERMINE THE FINANCIAL INSTITUTIONS AND ACCOUNT INFORMATION FOR THE IDENTIFIED NEW ACCOUNTS OPERATION 207.

In one embodiment, at PROCESS THE DIGITAL IMAGE DATA USING ONE OR MORE OCR SYSTEMS TO IDENTIFY POTENTIAL NEW ACCOUNTS ASSOCIATED WITH THE NEW ACCOUNT RELATED ITEMS AND DETERMINE THE FINANCIAL INSTITUTIONS AND ACCOUNT INFORMATION FOR THE IDENTIFIED NEW ACCOUNTS OPERATION 207 account information associated with each of the identified individual account related items/accounts of PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205 is extracted using one or more OCR systems and associated with the identified individual account related items.

In one embodiment, at PROCESS THE DIGITAL IMAGE DATA USING ONE OR MORE OCR SYSTEMS TO IDENTIFY POTENTIAL NEW ACCOUNTS ASSOCIATED WITH THE NEW ACCOUNT RELATED ITEMS AND DETERMINE THE FINANCIAL INSTITUTIONS AND ACCOUNT INFORMATION FOR THE IDENTIFIED NEW ACCOUNTS OPERATION 207 account information associated with each of the identified individual account related items/accounts of PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205 is extracted using one or more OCR systems, associated with the identified individual account related items, and saved as image based account data, such as image account data 111 of FIG. 1.

Returning to FIG. 2, in one embodiment, at PROCESS THE DIGITAL IMAGE DATA USING ONE OR MORE OCR SYSTEMS TO IDENTIFY POTENTIAL NEW ACCOUNTS ASSOCIATED WITH THE NEW ACCOUNT RELATED ITEMS AND DETERMINE THE FINANCIAL INSTITUTIONS AND ACCOUNT INFORMATION FOR THE IDENTIFIED NEW ACCOUNTS OPERATION 207 using OCR, and/or pattern matching technology, the financial institution, account number, routing number, memo data, and/or various other account identification data that is included in the obtained digital image of the account related items is transformed into electronic image based account data, such as image account data 111 of FIG. 1, that is readable, and usable, by a financial management system, such as financial management system 180 of FIG. 1, in the same way any electronic data is processed.

Returning to FIG. 2, once account information associated with each of the identified individual account related items/accounts of PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205 is extracted and associated with the identified individual account related items at PROCESS THE DIGITAL IMAGE DATA USING ONE OR MORE OCR SYSTEMS TO IDENTIFY POTENTIAL NEW ACCOUNTS ASSOCIATED WITH THE NEW ACCOUNT RELATED ITEMS AND DETERMINE THE FINANCIAL INSTITUTIONS AND ACCOUNT INFORMATION FOR THE IDENTIFIED NEW ACCOUNTS OPERATION 207, process flow proceeds to USE AT LEAST PART OF THE ACCOUNT INFORMATION ASSOCIATED WITH THE IDENTIFIED POTENTIAL NEW ACCOUNTS TO AUTO-FILL NEW ACCOUNT FORM FIELDS FOR EACH OF THE IDENTIFIED POTENTIAL NEW ACCOUNTS OPERATION 209.

In one embodiment, at USE AT LEAST PART OF THE ACCOUNT INFORMATION ASSOCIATED WITH THE IDENTIFIED POTENTIAL NEW ACCOUNTS TO AUTO-FILL NEW ACCOUNT FORM FIELDS FOR EACH OF THE IDENTIFIED POTENTIAL NEW ACCOUNTS OPERATION 209 the image-based account information associated with each of the identified individual account related items of PROCESS THE DIGITAL IMAGE DATA USING ONE OR MORE OCR SYSTEMS TO IDENTIFY POTENTIAL NEW ACCOUNTS ASSOCIATED WITH THE NEW ACCOUNT RELATED ITEMS AND DETERMINE THE FINANCIAL INSTITUTIONS AND ACCOUNT INFORMATION FOR THE IDENTIFIED NEW ACCOUNTS OPERATION 207 is used to auto-fill data entry fields in add account forms used with a data management system.

In one embodiment, once the image-based account information associated with each of the identified individual account related items of PROCESS THE DIGITAL IMAGE DATA USING ONE OR MORE OCR SYSTEMS TO IDENTIFY POTENTIAL NEW ACCOUNTS ASSOCIATED WITH THE NEW ACCOUNT RELATED ITEMS AND DETERMINE THE FINANCIAL INSTITUTIONS AND ACCOUNT INFORMATION FOR THE IDENTIFIED NEW ACCOUNTS OPERATION 207 is used to auto-fill data entry fields in add account forms used with a data management system at USE AT LEAST PART OF THE ACCOUNT INFORMATION ASSOCIATED WITH THE IDENTIFIED POTENTIAL NEW ACCOUNTS TO AUTO-FILL NEW ACCOUNT FORM FIELDS FOR EACH OF THE IDENTIFIED POTENTIAL NEW ACCOUNTS OPERATION 209, process flow proceeds to PROVIDE THE AUTO-FILLED NEW ACCOUNT FORMS FOR EACH OF THE IDENTIFIED POTENTIAL NEW ACCOUNTS TO THE USER FOR REVIEW AND/OR APPROVAL OPERATION 211.

In one embodiment, at PROVIDE THE AUTO-FILLED NEW ACCOUNT FORMS FOR EACH OF THE IDENTIFIED POTENTIAL NEW ACCOUNTS TO THE USER FOR REVIEW AND/OR APPROVAL OPERATION 211, the auto-filled add account forms of USE AT LEAST PART OF THE ACCOUNT INFORMATION ASSOCIATED WITH THE IDENTIFIED POTENTIAL NEW ACCOUNTS TO AUTO-FILL NEW ACCOUNT FORM FIELDS FOR EACH OF THE IDENTIFIED POTENTIAL NEW ACCOUNTS OPERATION 209 are presented to the user for review and/or approval.

In one embodiment, at PROVIDE THE AUTO-FILLED NEW ACCOUNT FORMS FOR EACH OF THE IDENTIFIED POTENTIAL NEW ACCOUNTS TO THE USER FOR REVIEW AND/OR APPROVAL OPERATION 211, the auto-filled add account forms of USE AT LEAST PART OF THE ACCOUNT INFORMATION ASSOCIATED WITH THE IDENTIFIED POTENTIAL NEW ACCOUNTS TO AUTO-FILL NEW ACCOUNT FORM FIELDS FOR EACH OF THE IDENTIFIED POTENTIAL NEW ACCOUNTS OPERATION 209 are presented to the user as auto-filled new account data, such as auto-filled new account data 113 of FIG. 1, for review and/or approval via a single user interface screen display displayed on a display device associated with a user computing system, such as user computing system 100 of FIG. 1.

Figure 5:
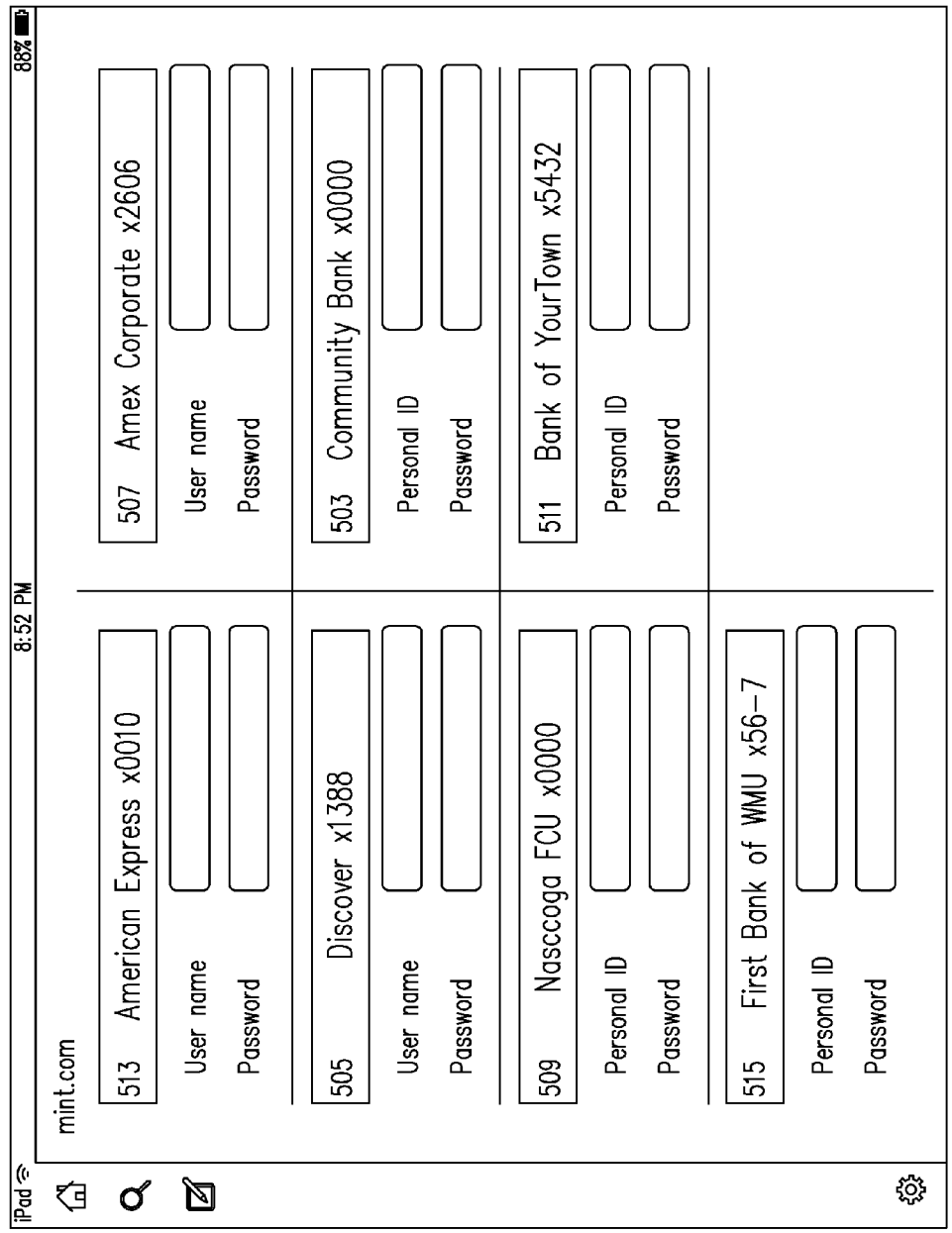
FIG. 5 is an illustrative example of auto-filled account identification/creation fields associated with each of the identified individual account related items, and/or any other account related items, in accordance with one embodiment.

FIG. 5 is an illustrative example of add account forms 503, 505, 507, 509, 511, 513, and 515 auto-filled for each of the identified individual account related items 303, 305, 307, 309, 311, 313, and 315 of FIGS. 3 and 4, as would be presented to a user at PROVIDE THE AUTO-FILLED NEW ACCOUNT FORMS FOR EACH OF THE IDENTIFIED POTENTIAL NEW ACCOUNTS TO THE USER FOR REVIEW AND/OR APPROVAL OPERATION 211 in accordance with one embodiment.

As seen in FIG. 5, account related item 303 of FIG. 3 that is an ATM card for an account with "Community Bank" having an account number ending in "0000" is transformed into auto-filed add account form 503 of FIG. 5; account related item 305 of FIG. 3, that is a "Discover Card" credit account card with an account number ending in "1388" is transformed into auto-filed add account form 505; account related item 307 of FIG. 3 that is an "American Express" or "Amex" corporate credit account card with an account number ending in "2606" is transformed into auto-filed add account form 507 of FIG. 5; account related item 309 of FIG. 3 that is a "Nascoga Credit Union" account card with an account number ending in "0000" is transformed into auto-filed add account form 509 of FIG. 5; account related item 311 of FIG. 3 that is a "Bank of Your Town" check associated with a checking account having an account number ending in "5432" is transformed into auto-filed add account form 511 of FIG. 5; account related item 313 of FIG. 3, that is an "American Express" or "Amex" personal credit account card with an account number ending in "0010" is transformed into auto-filed add account form 513 of FIG. 5; and account related item 315 of FIG. 3 that is a "First Bank of WMU" check associated with a checking account having an account number ending in "56-7" is transformed into auto-filed add account form 513 of FIG. 5.

Returning to FIG. 2, in one embodiment, once the auto-filled add account forms of USE AT LEAST PART OF THE ACCOUNT INFORMATION ASSOCIATED WITH THE IDENTIFIED POTENTIAL NEW ACCOUNTS TO AUTO-FILL NEW ACCOUNT FORM FIELDS FOR EACH OF THE IDENTIFIED POTENTIAL NEW ACCOUNTS OPERATION 209 are presented to the user for review and/or approval at PROVIDE THE AUTO-FILLED NEW ACCOUNT FORMS FOR EACH OF THE IDENTIFIED POTENTIAL NEW ACCOUNTS TO THE USER FOR REVIEW AND/OR APPROVAL OPERATION 211, process flow proceeds to FOR EACH APPROVED NEW ACCOUNT, OBTAIN ACCOUNT LOGIN INFORMATION FROM THE USER OPERATION 213.

In one embodiment, at FOR EACH APPROVED NEW ACCOUNT, OBTAIN ACCOUNT LOGIN INFORMATION FROM THE USER OPERATION 213 once the user approves the addition of the identified accounts and account information at PROVIDE THE AUTO-FILLED NEW ACCOUNT FORMS FOR EACH OF THE IDENTIFIED POTENTIAL NEW ACCOUNTS TO THE USER FOR REVIEW AND/OR APPROVAL OPERATION 211, the user provides login information, such as password and user name information, for each new account, thereby completing the add account forms.

In one embodiment, at FOR EACH APPROVED NEW ACCOUNT, OBTAIN ACCOUNT LOGIN INFORMATION FROM THE USER OPERATION 213 the user provided login information, such as password and user name information, for each new account, is provided as user provided approval and/or account data 115 of FIG. 1.

In one embodiment, as user enters the user provided login information for a given account, an authentication process starts in parallel.

In one embodiment, once the user approves the addition of the identified accounts and account information at PROVIDE THE AUTO-FILLED NEW ACCOUNT FORMS FOR EACH OF THE IDENTIFIED POTENTIAL NEW ACCOUNTS TO THE USER FOR REVIEW AND/OR APPROVAL OPERATION 211 and the user provides login information, such as password and user name information, for each new account at FOR EACH APPROVED NEW ACCOUNT, OBTAIN ACCOUNT LOGIN INFORMATION FROM THE USER OPERATION 213, process flow proceeds to PROVIDE THE COMPLETED NEW ACCOUNT FORMS FOR EACH APPROVED NEW ACCOUNT, INCLUDING THE AUTO-FILLED NEW ACCOUNT DATA AND THE ACCOUNT LOGIN INFORMATION FROM THE USER TO ONE OR MORE DATA MANAGEMENT SYSTEMS OPERATION 215.

In one embodiment, at PROVIDE THE COMPLETED NEW ACCOUNT FORMS FOR EACH APPROVED NEW ACCOUNT, INCLUDING THE AUTO-FILLED NEW ACCOUNT DATA AND THE ACCOUNT LOGIN INFORMATION FROM THE USER TO ONE OR MORE DATA MANAGEMENT SYSTEMS OPERATION 215 the completed add account forms including the approved identified accounts, account information, user login information, is then automatically provided to a data management system, such as a financial management system, and/or used by the data management system to obtain data associated with the user.

In one embodiment, at PROVIDE THE COMPLETED NEW ACCOUNT FORMS FOR EACH APPROVED NEW ACCOUNT, INCLUDING THE AUTO-FILLED NEW ACCOUNT DATA AND THE ACCOUNT LOGIN INFORMATION FROM THE USER TO ONE OR MORE DATA MANAGEMENT SYSTEMS OPERATION 215 the completed add account forms including the approved identified accounts, account information, user login information, is then automatically provided to a data management system, such as financial management system 180 of FIG. 1, and is used by the data management system to obtain data associated with the user.

As noted above, herein, a financial management system can be, but is not limited to, any data management system implemented on a computing system and/or accessed through a network that gathers financial data, including financial transactional data, from one or more sources and/or has the capability to analyze and categorize at least part of the financial data.

As noted above, herein, the term financial management system includes, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filling or as developed later.

Specific examples of financial management systems include, but are not limited to: Quicken™, available from Intuit, Inc. of Mountain View, Calif.; Quicken On-Line™, available from Intuit, Inc. of Mountain View, Calif.; QuickBooks™, available from Intuit, Inc. of Mountain View, Calif.; QuickBooks On-Line™, available from Intuit, Inc. of Mountain View, Calif.; Mint™, available from Intuit, Inc. of Mountain View, Calif.; Mint Mobile™, available from Intuit, Inc. of Mountain View, Calif., Quicken Health Expense Manager™, available from Intuit, Inc. of Mountain View, Calif.; Microsoft Money™, previously available from Microsoft, Inc. of Redmond, Wash.; and/or various other financial management systems discussed herein, and/or known to those of skill in the art at the time of filing, and/or as developed after the time of filing.

As a specific illustrative example, assume John Doe is a first-time user of a mobile financial management system, such as Mint™, available from Inuit, Inc., of Mountain View Calif., USA. In this specific illustrative example assume John installs Mint™ for iPad™ and proceeds to log in for the first time.

In this specific illustrative example, at OBTAIN DIGITAL IMAGE DATA OF ONE OR MORE NEW ACCOUNT RELATED ITEMS USING A DIGITAL CAMERA FUNCTION OPERATION 203 John lays out all his credit cards and bank debit cards, and check books on a flat surface. In this specific illustrative example, at OBTAIN DIGITAL IMAGE DATA OF ONE OR MORE NEW ACCOUNT RELATED ITEMS USING A DIGITAL CAMERA FUNCTION OPERATION 203 John uses his iPad™ camera capability to take a picture of the laid out credit cards and bank debit cards, and check books.

In this specific illustrative example, after the picture is taken, at PROCESS THE DIGITAL IMAGE DATA USING ONE OR MORE EDGE/BOUNDARY SYSTEMS TO DETERMINE THE NUMBER OF NEW ACCOUNT RELATED ITEMS IN THE DIGITAL IMAGE DATA OPERATION 205 an edge/boundary detection algorithm is applied to determine the number of credit card accounts and at PROCESS THE DIGITAL IMAGE DATA USING ONE OR MORE OCR SYSTEMS TO IDENTIFY POTENTIAL NEW ACCOUNTS ASSOCIATED WITH THE NEW ACCOUNT RELATED ITEMS AND DETERMINE THE FINANCIAL INSTITUTIONS AND ACCOUNT INFORMATION FOR THE IDENTIFIED NEW ACCOUNTS OPERATION 207 accounts in the collection are identified.

At USE AT LEAST PART OF THE ACCOUNT INFORMATION ASSOCIATED WITH THE IDENTIFIED POTENTIAL NEW ACCOUNTS TO AUTO-FILL NEW ACCOUNT FORM FIELDS FOR EACH OF THE IDENTIFIED POTENTIAL NEW ACCOUNTS OPERATION 209 add account forms are auto-filled for each identified bank accounts in the collection and John is shown a setup screen divided into credential entry fields for every detected credit card account and bank account at PROVIDE THE AUTO-FILLED NEW ACCOUNT FORMS FOR EACH OF THE IDENTIFIED POTENTIAL NEW ACCOUNTS TO THE USER FOR REVIEW AND/OR APPROVAL OPERATION 211.

In this specific illustrative example, at FOR EACH APPROVED NEW ACCOUNT, OBTAIN ACCOUNT LOGIN INFORMATION FROM THE USER OPERATION 213 John enters login credential data for each account in the setup screen and authentication automatically starts for the credential entered at PROVIDE THE COMPLETED NEW ACCOUNT FORMS FOR EACH APPROVED NEW ACCOUNT, INCLUDING THE AUTO-FILLED NEW ACCOUNT DATA AND THE ACCOUNT LOGIN INFORMATION FROM THE USER TO ONE OR MORE DATA MANAGEMENT SYSTEMS OPERATION 215.

In this specific illustrative example, while authentication of one account is in progress PROVIDE THE COMPLETED NEW ACCOUNT FORMS FOR EACH APPROVED NEW ACCOUNT, INCLUDING THE AUTO-FILLED NEW ACCOUNT DATA AND THE ACCOUNT LOGIN INFORMATION FROM THE USER TO ONE OR MORE DATA MANAGEMENT SYSTEMS OPERATION 215, John can enter credentials for another account in the setup screen.

In one embodiment, once the completed add account forms including the approved identified accounts, account information, user login information, is automatically provided to the data management system, and/or used by the data management system to obtain financial data associated with the user at PROVIDE THE COMPLETED NEW ACCOUNT FORMS FOR EACH APPROVED NEW ACCOUNT, INCLUDING THE AUTO-FILLED NEW ACCOUNT DATA AND THE ACCOUNT LOGIN INFORMATION FROM THE USER TO ONE OR MORE DATA MANAGEMENT SYSTEMS OPERATION 215, process flow proceeds to EXIT OPERATION 230.

In one embodiment, at EXIT OPERATION 230 process for semi-automated setup of accounts within a data management system 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for semi-automated setup of accounts within a data management system 200, a process is provided to simplify the add account process by making the add account process highly automated, intuitive, easy, efficient, and relatively error free.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for semi-automated setup of accounts within a data management system comprising:
    obtaining digital image data representing a single digital image of two or more physical account related items, the two or more physical account related items being associated with a user and comprising at least an account card associated with a first account and a check associated with a second account;
    processing the digital image data to identify individual components of image data representing respective individual account related items in the digital image data;
    using an optical character recognition system to identify image-based account information associated with the individual account related items in the digital image data;
    transforming the identified image-based account information associated with the individual account related items in the digital image data into electronic account information data;
    determining a number representing how many individual accounts are associated with the digital image data;
    for each account up to the number:
        prompt the user for account log-in data required to gain access to electronic account data associated with the account;
        responsive to and upon completion of log-in information being provided by the user for the account, accessing the electronic account data, using the log-in information;
        prompting, while accessing the electronic account data for the account for which log-in data has already been provided by the user, the user for account log-in data for an account for which log-in data has not yet been provided by the user;
    using the electronic account information data to auto-fill one or more add account fields for each identified individual account related item image.

2. The method for semi-automated setup of accounts within a data management system of claim 1, wherein;
    the digital image data representing a digital image of two or more account related items is obtained using a digital camera function associated with a user computing system.

3. The method for semi-automated setup of accounts within a data management system of claim 1, wherein;
    the digital image data representing a digital image of two or more account related items is obtained using a digital camera function associated with a user mobile computing system.

4. The method for semi-automated setup of accounts within a data management system of claim 1, wherein;
    at least one of the two or more account related items is selected from the group of account related items consisting of:
    credit cards associated with credit accounts;
    ATM cards associated with financial institution accounts;
    checks associated with financial institution accounts;
    membership cards;
    discount club cards.

5. The method for semi-automated setup of accounts within a data management system of claim 1, wherein;
    the image-based account information associated with the individual account related item images in the digital image data includes information identifying a financial institution associated with the individual account related items.

6. The method for semi-automated setup of accounts within a data management system of claim 1, wherein;
    the image-based account information associated with the individual account related item images in the digital image data includes information identifying an account number associated with the individual account related items.

7. The method for semi-automated setup of accounts within a data management system of claim 1, wherein;
    the electronic account information data is used to auto-fill one or more add account fields of data management system add account forms for each identified individual account related item image.

8. The method for semi-automated setup of accounts within a data management system of claim 1, wherein;
    the data management system is a financial management system.

9. The method for semi-automated setup of accounts within a data management system of claim 8, further comprising:
    providing the auto-filled add account fields to the user for review and/or approval.

10. The method for semi-automated setup of accounts within a data management system of claim 9, further comprising:
    the user adding account login information data to each of the approved auto-filled financial management system add account forms; and
    providing the approved auto-filled financial management system add account forms, including the account login information data, to the financial management system.

11. A computing system implemented process for semi-automated setup of accounts within a data management system comprising:
- using one or more processors to obtain digital image data representing a single digital image of two or more physical account related items, the two or more physical account related items being associated with a user and comprising at least an account card associated with a first account and a check associated with a second account;
- using one or more processors to process the digital image data to identify individual components of image data representing respective individual account related items in the digital image data;
- using one or more processors and an optical character recognition system to identify image-based account information associated with the individual account related items in the digital image data;
- using one or more processors to transform the identified image-based account information associated with the individual account related items in the digital image data into electronic account information data;
- determining a number representing how many individual accounts are associated with the digital image data;
- for each account up to the number:
  - prompt the user for account log-in data required to gain access to electronic account data associated with the account;
  - responsive to and upon completion of log-in information being provided by the user for the account, accessing the electronic account data, using the log-in information;
  - prompting, while accessing the electronic account data for the account for which log-in data has already been provided by the user, the user for account log-in data for an account for which log-in data has not yet been provided by the user;
  - using one or more processors and the electronic account information data to auto-fill one or more add account fields for each identified individual account related item image.

12. The computing system implemented process for semi-automated setup of accounts within a data management system of claim 11, wherein;
the digital image data representing a digital image of two or more account related items is obtained using a digital camera function associated with a user computing system.

13. The computing system implemented process for semi-automated setup of accounts within a data management system of claim 11, wherein;
the digital image data representing a digital image of two or more account related items is obtained using a digital camera function associated with a user mobile computing system.

14. The computing system implemented process for semi-automated setup of accounts within a data management system of claim 11, wherein;
at least one of the two or more account related items is selected from the group of account related items consisting of:
credit cards associated with credit accounts;
ATM cards associated with financial institution accounts;
checks associated with financial institution accounts;
membership cards;
frequent flyer cards; and
discount club cards.

15. The computing system implemented process for semi-automated setup of accounts within a data management system of claim 11, wherein;
the image-based account information associated with the individual account related item images in the digital image data includes information identifying a financial institution associated with the individual account related items.

16. The computing system implemented process for semi-automated setup of accounts within a data management system of claim 11, wherein;
the image-based account information associated with the individual account related item images in the digital image data includes information identifying an account number associated with the individual account related items.

17. The computing system implemented process for semi-automated setup of accounts within a data management system of claim 11, wherein;
the electronic account information data is used to auto-fill one or more add account fields of data management system add account forms for each identified individual account related item image.

18. The computing system implemented process for semi-automated setup of accounts within a data management system of claim 11, wherein;
the data management system is a financial management system.

19. The computing system implemented process for semi-automated setup of accounts within a data management system of claim 18, further comprising:
providing the auto-filled add account fields to the user for review and/or approval.

20. The computing system implemented process for semi-automated setup of accounts within a data management system of claim 19, further comprising:
the user adding account login information data to each of the approved auto-filled financial management system add account forms; and
providing the approved auto-filled financial management system add account forms, including the account login information data, to the financial management system.

21. A system for semi-automated setup of accounts within a data management system comprising:
a user computing system, the user computing system being associated with a user, the user computing system including a camera function;
one or more account related items, the one or more account related items being associated with the user;
an optical character recognition system;
a data management system; and
one or more processors associated with one or more computing systems, the one or more processors associated with one or more computing systems implementing at least part of a process for semi-automated setup of accounts within a data management system, the process for semi-automated setup of accounts within a data management system including:
using the camera function of the user computing system to obtain digital image data representing a single digital image of the two or more account related items, the two or more physical account related items being associated with a user and comprising at least an account card associated with a first account and a check associated with a second account;

using the one or more processors associated with one or more computing systems to process the digital image data to identify individual account related items in the digital image data;

using the one or more processors associated with one or more computing systems and the optical character recognition system to identify individual components of image data representing respective individual account related items in the digital image data;

using the one or more processors associated with one or more computing systems to transform the identified image-based account information associated with the individual account related item images in the digital image data into electronic account information data;

determining a number representing how many individual accounts are associated with the digital image data;

for each account up to the number:

prompt the user for account log-in data required to gain access to electronic account data associated with the account;

responsive to and upon completion of log-in information being provided by the user for the account, accessing the electronic account data, using the log-in information;

prompting, while accessing the electronic account data for the account for which log-in data has already been provided by the user, the user for account log-in data for an account for which log-in data has not yet been provided by the user;

using the one or more processors associated with one or more computing systems and the electronic account information data to auto-fill one or more add account fields for each identified individual account related item image.

22. The system for semi-automated setup of accounts within a data management system of claim 21, wherein;

the user computing system is a mobile computing system.

23. The system for semi-automated setup of accounts within a data management system of claim 21, wherein;

at least one of the two or more account related items is selected from the group of account related items consisting of:

credit cards associated with credit accounts;

ATM cards associated with financial institution accounts;

checks associated with financial institution accounts;

membership cards;

frequent flyer cards; and discount club cards.

24. The system for semi-automated setup of accounts within a data management system of claim 21, wherein;

the image-based account information associated with the individual account related item images in the digital image data includes information identifying a financial institution associated with the individual account related items.

25. The system for semi-automated setup of accounts within a data management system of claim 21, wherein;

the image-based account information associated with the individual account related item images in the digital image data includes information identifying an account number associated with the individual account related items.

26. The system for semi-automated setup of accounts within a data management system of claim 21, wherein;

the electronic account information data is used to auto-fill one or more add account fields of data management system add account forms for each identified individual account related item image.

27. The system for semi-automated setup of accounts within a data management system of claim 21, wherein;

the data management system is a financial management system.

28. The system for semi-automated setup of accounts within a data management system of claim 27, further comprising:

providing the auto-filled add account fields to the user for review and/or approval.

29. The system for semi-automated setup of accounts within a data management system of claim 28, further comprising:

the user adding account login information data to each of the approved auto-filled financial management system add account forms; and providing the approved auto-filled financial management system add account forms, including the account login information data, to the financial management system.

* * * * *

UNITED STATES PATENT AND TRADEMARK OFFICE
CERTIFICATE OF CORRECTION

| | | |
|---|---|---|
| PATENT NO. | : 8,855,377 B1 | Page 1 of 1 |
| APPLICATION NO. | : 13/416966 | |
| DATED | : October 7, 2014 | |
| INVENTOR(S) | : Sunil Madhani | |

It is certified that error appears in the above-identified patent and that said Letters Patent is hereby corrected as shown below:

In the Claims

In Column 20, between Lines 27 and 28, Claim 4, insert --frequent flyer cards; and--.

Signed and Sealed this
Seventeenth Day of March, 2015

Michelle K. Lee
*Director of the United States Patent and Trademark Office*